Patented Aug. 2, 1938

2,125,844

UNITED STATES PATENT OFFICE 2,125,844

PROCESS OF PREPARING LIVER EXTRACTS

Havard L. Keil, Chicago, Ill., assignor to Armour and Company, Chicago, Ill., a corporation of Illinois No Drawing. Application February 15, 1937, Serial No. 125,931

8 Claims. (Cl. 167—74)

This invention relates to processes of preparing liver extracts, and it includes processes wherein ground livers are subjected to extraction with warm water, the extract concentrated to pasty form, the paste taken up in an aqueous alcohol solution, and the alcoholic solution refrigerated at a temperature of at least about minus 20° F. or below, and the alcoholic solution of anti-anemic principle decanted or filtered from impurities separated out at the low temperature stated.

Liver concentrates for use as therapeutic agents are customarily prepared by subjecting ground animal livers to extraction with water heated to about 180° F. After the extraction process is completed the mixture of aqueous extract and residue is filtered, or the liquid extract separated from the residue in equivalent ways. The extract is then concentrated to a paste by evaporation in vacuo, aqueous alcohol solution of about 70 percent strength is added, the solution filtered and the filtrate concentrated to a final paste in which the anti-anemic value in one gram of the paste is equivalent to about ninety-five grams of original fresh liver starting material. This liver paste can then be administered orally in capsules or taken up in inocuous solvents usually alcoholic to get a liquid concentrate for oral administration.

Liver extracts prepared in the manner stated still contain small amounts of undesirable proteins, although much of the protein is coagulated by the hot aqueous extracting agent. In addition to proteins, the extracts contain glycogen, soluble dextrins, glucose, and lipoids. The amounts of these impurities is such that they render the extract unsuitable for hypodermatic injection. These impurities can not, however, be removed readily by ordinary chemical precipitants and no satisfactory non-chemical way of preparing a highly concentrated paste which is sufficiently free of the above-stated impurities has hitherto been available.

I have now discovered that the impurities in these liver extracts, and concentrated pastes obtained therefrom, can, however, be removed when the paste is made alcoholic and the alcohol solution subjected to extremely low temperature, at least as low as minus 15° F. and generally as low as minus 20° F. I have discovered that at these low temperatures the proteins, glycogen, dextrins and other impurities crystallize out, and that the cold alcoholic solution can be readily decanted from the impurities, or the mixture of precipitated impurities and alcoholic solution can be filtered. This way of separating residual impurities from ordinary concentrated liver pastes has many advantages, chief among which is the fact that nothing has been added to the paste which can lessen the activity of the therapeutic principles in the paste. Thus I avoid the use of chemical reagents which may seriously modify, destroy, or adulterate the anti-anemic principles extracted from the livers.

Moreover, my final paste or concentrate has a much higher concentration with respect to the original starting liver. By that I mean, the final paste of my invention is such that 1 gram thereof represents about 235 grams of the fresh liver. Consequently, I can prepare solutions for hypodermatic injection containing about 25 percent of total solids wherein 1 cc. of the solutions represents the anti-anemic substances derived from 100 grams of liver.

In practicing my invention I first prepare a liver paste in the well-known way by extracting ground animal livers with hot water having a temperature of about 180° F. The extract, after separation of insoluble residue, is then concentrated to a paste in vacuo, as usually done in the art, and the paste taken up in aqueous alcohol of 70 percent strength. Any undissolved material is filtered off and the alcoholic solution concentrated to a paste. This paste, as stated, is such that about 1 gram represents ninety-five grams of fresh livers.

The paste prepared in the manner described above is an ordinary article of commerce and I lay no claim to the steps of making it.

Since hot water is used for the extraction of the liver much of the normal protein content of the liver is coagulated and does not appear in the extract. However, the extract does contain significant amounts of glycogen and dextrin, and smaller amounts of proteins which impurities, as stated, are removed by my invention.

To each 100 grams of the paste prepared and described above I then add about 400 cubic centimeters of a 70 percent solution of alcohol. This alcoholic solution can be made up from pure grain alcohol, but ordinarily it is more economical to use a denatured alcohol. One such denatured alcohol of commerce consists of 90 percent ethyl alcohol, 5 percent methyl alcohol and 5 percent water. The denatured alcohol is, of course, diluted with water until its alcoholic content amounts to about 70 percent by volume. For best results the strength of the alcohol solution should be about 70 percent, but this can vary from about 60 to 80 percent by volume. After adding the aqueous alcohol to the paste the mixture is then well stirred and placed in a cooler operating at a temperature of not more than about minus 20° F. The mixture is kept in the cooler for about 16 to 20 hours during which time the remaining proteins, glycogen, dextrin, small quantities of lipoid materials, and other impurities precipitate out. The alcoholic mixture is kept refrigerated until no further precipitation occurs. Aqueous alcohol of the concentration stated completely dissolves the anti-anemic principle of liver even at the low temperature stated, but undesirable impurities precipitate or crystallize out of solution. The supernatant alcoholic layer can be readily decanted or filtered from the precipitate, such separation, of course, being performed at the low temperature used for chilling. During the refrigeration, I can allow the temperature to increase by two or three degrees, but I do not obtain the benefits of my invention unless the temperature during the chilling is minus 15° F. or lower.

The decanted alcoholic solution is then evaporated under vacuo to a thick syrup containing about 66 percent of total solids. At this stage the product is biuret negative, indicating that no proteins are present, but the product still contains small quantities of reducing substances which may possibly be glucose. The syrup is next warmed until its consistency is more fluid. To each 100 grams of the warm syrup thus formed I add about 800 cubic centimeters of absolute ethyl alcohol. The syrup is best added to the alcohol while stirring vigorously, and stirring is continued until the insoluble solids in the mixture become light in color. The mixture is then allowed to settle, the alcohol decanted from the solids or filtered off, and the solids then dried on pans in vacuo at the usual low absolute pressures, 28 inches or less, employed in this art.

The resulting pasty material amounts to about one-third of the original starting paste. Its concentration is such that about 1 part of the paste represents the potency of 285 parts of original fresh livers. The paste can be dissolved in diluted alcohol or other solvents to give a liquid solution, wherein 1 cubic centimeter represents the anti-anemic substances derived from 100 grams of liver.

In the above description I show how my invention can be practised by starting with the ordinary liver pastes of commerce. I can vary my procedure, if desired, in the following manner. I can extract the fresh ground livers with warm water at a temperature of about 180° F., concentrate the water extract to a paste, take up the paste in 70 percent aqueous alcohol solution and then directly proceed to chill this solution at minus 20° F. The subsequent steps of decanting or filtering the alcohol solution while at minus 20° F., concentration to a syrup, admixture of the syrup with absolute alcohol and recovery of the final product are identical with those given in the preceding example.

It is understood that variations in the proportions of alcoholic solutions used can be resorted to. Obviously those skilled in the art will understand that the amount of aqueous alcohol used should be sufficient to form fluid mixtures which, after chilling, can be decanted or filtered. Consequently, I do not wish to be limited to any particular proportions.

Having thus described my invention, what I claim is:

1. In the process of preparing liver extracts, the steps of freeing such extracts if impurities which comprise admixing a paste of the water soluble constituents of the liver with an aqueous alcohol solution having an alcoholic strength of about 60 to 80 percent by volume, cooling the mixture to a temperature of not more than minus 15° F., maintaining the cooled mixture at said temperature for a period of time to effect precipitation of substances insoluble in the solution at this temperature, and then separating insoluble substances from the alcoholic solution.

2. The process as in claim 1 wherein the cooling temperature is minus 20° F.

3. The process as in claim 1 wherein the alcohol solution has a strength of about 70 percent by volume.

4. The process as in claim 1 wherein the cooling temperature is minus 20° F. and the alcohol solution has a strength of about 70 percent by volume.

5. The process of obtaining a liver extract which comprises admixing a paste of the water soluble constituents of liver with an aqueous alcohol solution having a strength of about 60 to 80 percent by volume, chilling the mixture to a temperature of not more than minus 15° F. maintaining the chilled solution at said temperature to insure precipitation of substances insoluble in the solution at said temperature, separating the alcoholic solution from the solids, evaporating the alcoholic solution in vacuo to a syrup, admixing the syrup with absolute alcohol, removing insoluble material from the alcohol solution, and drying the insoluble material in vacuo.

6. The process as in claim 5 wherein the cooling temperature is minus 20° F.

7. The process as in claim 5 wherein the alcohol solution has a strength of about 70 percent by volume.

8. The process as in claim 5 wherein the cooling temperature is minus 20° F. and the alcohol solution has a strength of about 70 percent by volume.

HAVARD L. KEIL.